C. H. SCHMINCKE.
Grain-Meter.
No. 217,553.          Patented July 15, 1879.
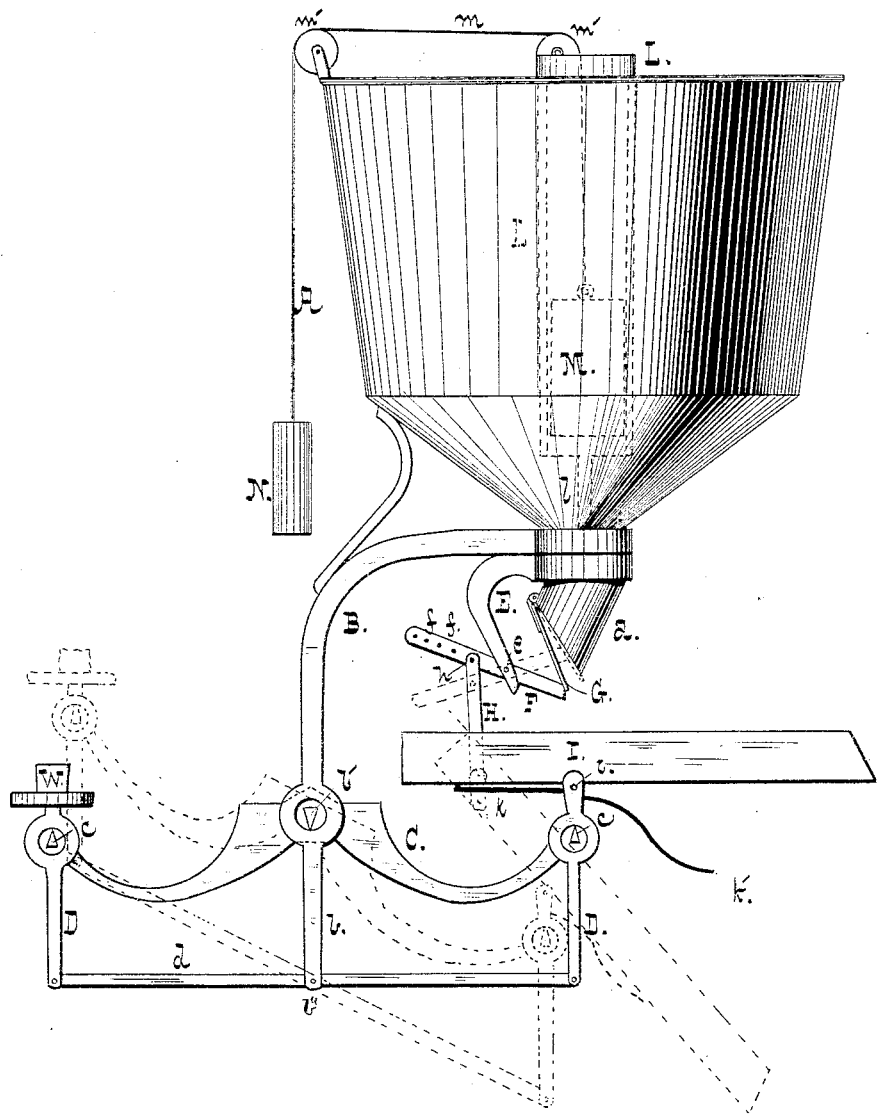
Witnesses,
W. A. Bertram
D. L. H. Barclay
Inventor
C. H. Schmincke
by
R. D. Williams
Attorney.

UNITED STATES PATENT OFFICE.

CHARLES H. SCHMINCKE, OF BALTIMORE, MARYLAND.

IMPROVEMENT IN GRAIN-METERS.

Specification forming part of Letters Patent No. 217,553, dated July 15, 1879; application filed April 8, 1879.

*To all whom it may concern:*

Be it known that I, CHARLES H. SCHMINCKE, of Baltimore city, State of Maryland, have invented certain new and useful Improvements in Automatic Scales; and I hereby declare the same to be fully, clearly, and exactly described as follows, reference being had to the accompanying drawing, in which the device is illustrated in side elevation.

My invention has reference to apparatus for automatically weighing off given quantities of material; and it consists in a device for accomplishing that end, constructed as hereinafter described, and possessing points of novelty that are made the subjects of the claims.

The device about to be described is designed especially for use in weighing off in rapid succession equal portions of such materials as are in the form of grains or powder—such, for instance, as chemical salts, sugar, salt, powder, shot, snuff, smoking-tobacco, or other substances of like nature as regards the size and form of their particles. It is essential, in a word, that the material to be weighed be of such nature as to admit of its flowing in the form of a stream from an orifice.

In the accompanying drawing, A is a hopper of suitable size and shape, terminating below in an inclined spout, $a$, having a beveled end, as shown. To the spout is hinged a cover, G, that rests against a lever, F, pivoted at $e$ in a bracket, E, rigidly secured to the hopper. B is a brace supporting the scale-beam C, which is provided with the usual knife-edge $b'$.

D D are the supports for the pan I and weight W, and rest on knife-edges $c$ $c$ on the ends of the beam. The lower ends of the supports D are pivoted to a rod, $d$, that is centrally pivoted at $b''$ to the continuation $b$ of the brace B, the object being to keep the supports D vertical as the beam is tilted.

The pan I is pivoted at $i$ to the support D, and normally rests in a horizontal position upon a bar, $k$. Upon the bottom of the pan is pivoted a rod, H, that is attached at $h$ to the lever F, the latter being provided with holes $f$ $f$ for other adjustments.

L is a tube mounted within the hopper A, and centrally above its discharge-spout $a$, where it is supported on arms $l$. Within it slides freely a plug, M, adapted to close the orifice in the bottom of the hopper, and long enough to reach to a point within the tube when resting upon the orifice, thereby preventing the entrance of the material within the hopper into the tube.

The plug is suspended by a cord, $m$, led over pulleys $m'$ $m'$, and having a counterpoise, N, attached to the other end.

The operation of the device is as follows: The material to be weighed being placed within the hopper, and a weight representing the quantity to be weighed off being placed on the weight-pan, the plug is retracted within the tube L, and the material flows through the spout $a$ upon the pan I. As soon as the weight of the counterpoise W is exceeded the pan descends and the cover G is closed, being actuated by the lever F and rod H. The pan continues to descend after the cover is closed, and is tilted, as shown in dotted lines, until its forward end brings up against the support $k'$, when its contents are discharged. The equipoise being destroyed, the pan rises and opens the cover G, and the operation is repeated.

When it is desired to stop the operation the counterpoise N is raised, and the plug M descends and closes the orifice.

What I claim is—

1. In combination with the hopper A, spout $a$, and cover G, the lever F, connected to the scale-pan and adapted to close the cover, and, through the medium of the rod H, pivoted thereto to tilt the pan, as set forth.

2. In combination with the brace B, automatically-discharging hopper A, beam C, and supports D, the pivoted bar $d$, substantially as described.

3. In combination with the scale-beam C, brace B, and supports D, the pan I, rod H, lever F, cover G, and hopper A, substantially as described.

4. In combination with the hopper A, the tube L and plug M, the latter being of a length to close the bottom of the tube and the orifice in the hopper, whereby the entrance of the material into the tube is prevented, as set forth.

5. In combination with the hopper A and tube L, the plug M, cord $m$, and counterpoise N, substantially as described.

CHARLES H. SCHMINCKE.

Witnesses:
R. D. WILLIAMS,
H. SCHMINCKE.